United States Patent [19]
Bruckner et al.

[11] Patent Number: 4,798,945
[45] Date of Patent: Jan. 17, 1989

[54] GRABBER MECHANISM FOR A BADGE READER TERMINAL

[75] Inventors: Ronald L. Bruckner, Longwood; James W. Driscoll, Sanford, both of Fla.

[73] Assignee: NCR Corporation, Dayton, Ohio

[21] Appl. No.: 8,793

[22] Filed: Jan. 30, 1987

[51] Int. Cl.⁴ .................... G06K 13/00; G06K 7/00
[52] U.S. Cl. .................. 235/479; 235/475; 235/482; 235/486
[58] Field of Search ............ 235/479, 480, 475, 483, 235/482, 486, 476

[56] References Cited
U.S. PATENT DOCUMENTS 3,555,247  1/1971  Gruczelak .................. 235/479
3,627,994 12/1971  Sallach ..................... 235/479
3,760,391  4/1973  Wolf et al. ................. 235/480
4,081,131  3/1978  Sand et al. ................. 235/479
4,136,819  1/1979  Torita et al. ............... 235/476
4,443,693  4/1984  Berezowski ................. 235/479

Primary Examiner—Philip H. Leung
Assistant Examiner—Leon K. Fuller
Attorney, Agent, or Firm—Wilbert Hawk, Jr.; Edward Dugas; Floyd A. Gonzalez

[57] ABSTRACT

A grabber mechanism for use in a badge rader having a pivoted lever bar with a solenoid attached to one end and a grabber foot assembly attached to the other. When the solenoid is energized, the lever bar is pivoted such that the grabber foot assembly is moved away from a fixed partition which defines a throat in the badge reader, allowing a card to be inserted into the throat. When the solenoid is de-energized, the grabber foot assembly is urged by a spring into contact with the card, trapping the card between a rubber foot of the grabber assembly and the fixed partition sot that the card may be read by the badge reader.

11 Claims, 10 Drawing Sheets

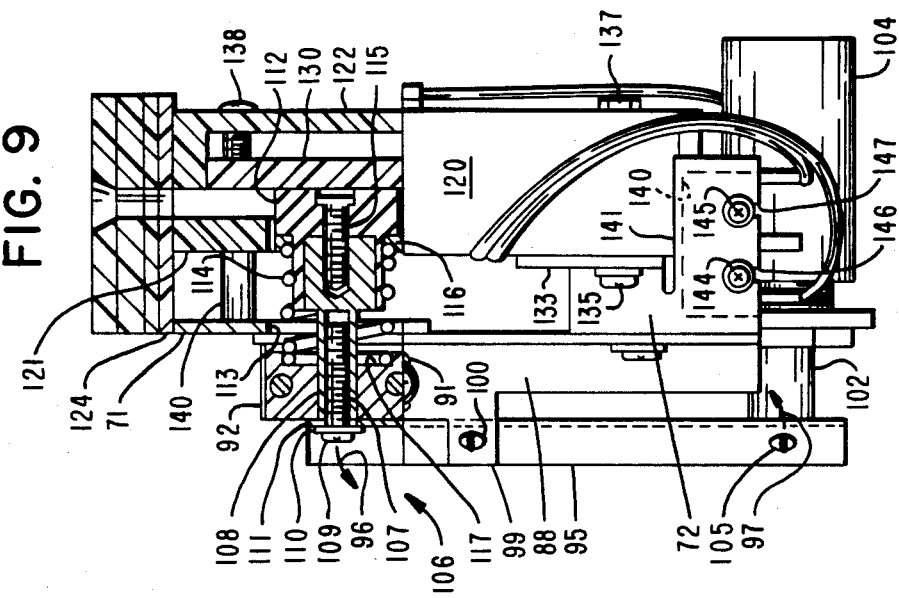
FIG. 9
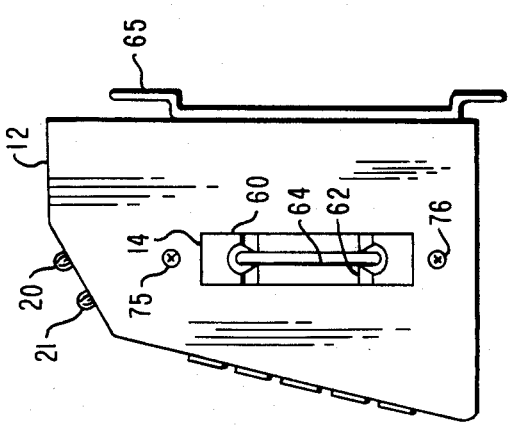
FIG. 4
FIG. 10

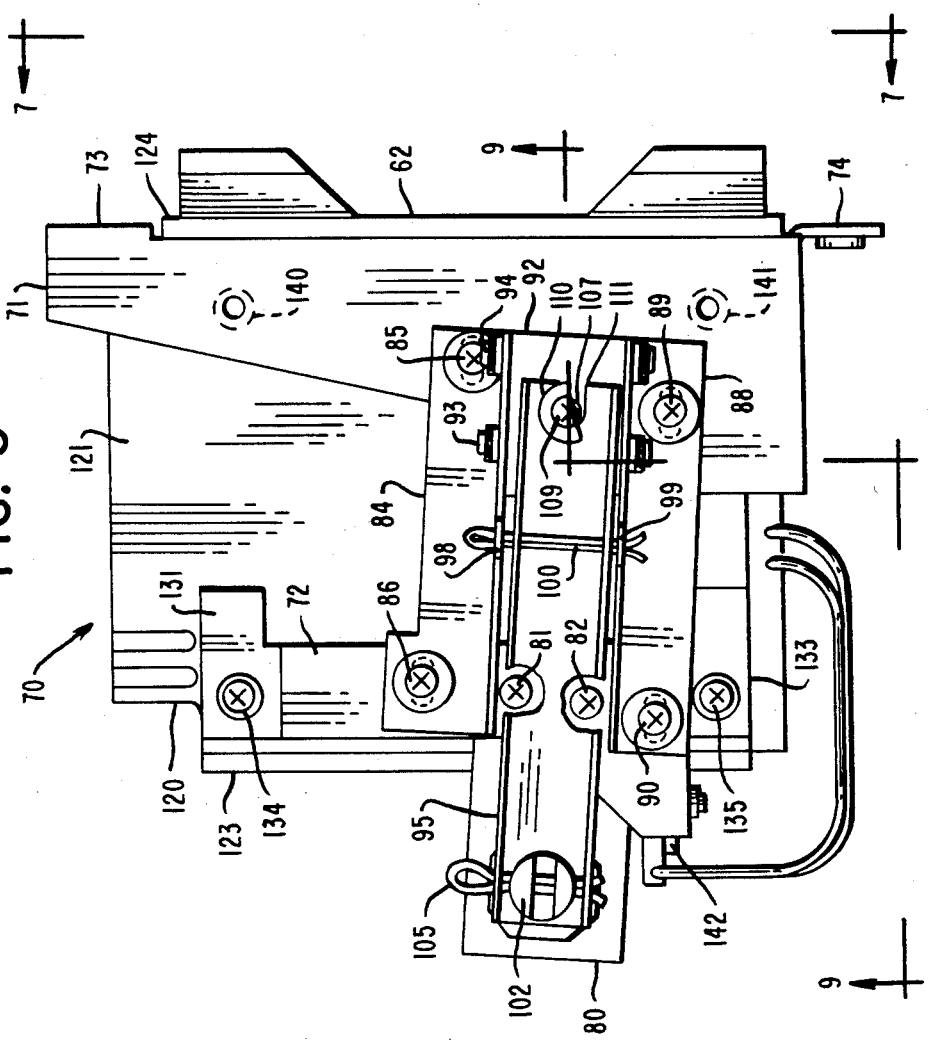

GRABBER MECHANISM FOR A BADGE READER TERMINAL

BACKGROUND OF THE INVENTION

The present invention relates to a computer terminal which includes a badge reader, and more particularly relates to a grabber mechanism for grabbing a badge and holding it in a specific location for reading.

A computer terminal may be provided with a badge reader such that it may function as a screening device to limit computer transactions to only those users with a valid badge. A few applications where such terminals are useful are automatic teller machines, security devices to control access to restricted areas, or time clock applications.

Before a badge may be read, it must be transported, either manually or mechanically, to a reading area wherein sensors in a badge reader may sense identifying data on the badge for verification.

U.S. Pat. No. 4,365,718 issued Dec. 28, 1982 to Howerton for "Ticket Metering and Throat Barrier Module" discloses a solenoid operated barrier gate selectively movable into and out of blocked positions for blocking the insertion of tickets into a passage of a ticket processing machine.

U.S. Pat. No. 3,626,159 issued Dec. 7, 1971 to Chumley for "Holddown Device for Encoded Member Reader" discloses a encoded card reader having a solenoid operated transport mechanism for engaging and urging a card into a desired predetermined position for scanning.

U S. Pat. No. 3,760,391 issued Sept. 18, 1973 to Wolf et al. for "Data Card Transport and Scanning Apparatus" discloses a data card transporting apparatus having photoelectric detectors for determining the entry of a card into the transporting apparatus and the positioning of the card at a predetermined limit.

U.S. Pat. No. 4,136,819 issued Jan. 30, 1979 to Torita et al. for "Card Processing Apparatus" discloses a card processing apparatus having a photoelectric sensor and electric switches for operating solenoid driving circuits as a card is transported through the card processing apparatus.

SUMMARY OF THE INVENTION

In a specific embodiment, a grabber mechanism in a badge reader for grabbing a card to be read includes a lever bar having a first end and a second end, a pivot intermediate the first and second ends of the lever bar about which the lever bar may rotate from a first position to a second position, and a solenoid connected to the first end of the lever bar. The solenoid moves the first end when energized such that the lever bar is moved from its first position to its second position. A grabber assembly has a proximate end attached to the second end of the lever bar, and a distal end. A spring in the grabber assembly is activated when the lever bar is rotated from its first position to its second position, and urges the grabber assembly and the attached second end of the lever bar from its second position toward its first position when said solenoid is not energized. A fixed partition has a plane generally normal to the distal end of the grabber means and is positioned at a location proximate to the location of the distal end when the lever bar is in its second position. When the lever bar moves to its second position, the distal end moves away from the fixed partition allowing a card to be read to be slidably moved between the distal end and the fixed partition. When the lever bar moves toward its first position from its second position, the card to be read is grabbed and held between the distal end and the fixed partition responsive to the urging of the spring.

An object of the present invention is to provide a grabber mechanism in a badge reader apparatus which opens to allow the insertion of a badge or card into the badge reader apparatus, and which grabs the card and holds it for reading upon the card reaching a predetermined reading location.

Another object of the present invention is to provide a grabber mechanism which has a lever pivoted about a point intermediate its ends, a solenoid on one end of the lever and a spring loaded grabber mechanism on the other end such that when the solenoid is energized the grabber mechanism is retracted from a first position to a second position, and when the solenoid is de-energized the spring loaded grabber mechanism is urged back to its first position for grabbing a badge or card for reading.

Another object of the present invention is to provide a grabber mechanism in a badge reader apparatus which is opened when a card is inserted into a throat of the badge reader apparatus, and which closes grabbing the card when the card is fully inserted to a predetermined limit in the throat.

Another object of the present invention is to provide a grabber mechanism in a badge reader apparatus which, when the grabber mechanism is energized, gives a slight kick to a card in the badge reader apparatus such that the card is partially ejected from the badge reader apparatus.

These and other objects of the present invention will become apparent from the drawings and the description of the preferred embodiment disclosed herein.

BRIEF DESCRIPTION OF THE DRAWINGS

FIG. 4 is a right side elevational view of the input/output device of FIG. 1;

FIG. 5 is a right side elevational view of a badge reader module of the input/output device of FIG. 1;

FIG. 9 is a bottom elevational view of the badge reader module taken along line 9—9 of FIG 5;

FIG. 10 is a portion of the badge reader module shown in FIGS. 5-9;

DESCRIPTION OF THE PREFERRED EMBODIMENT

Figure 2:
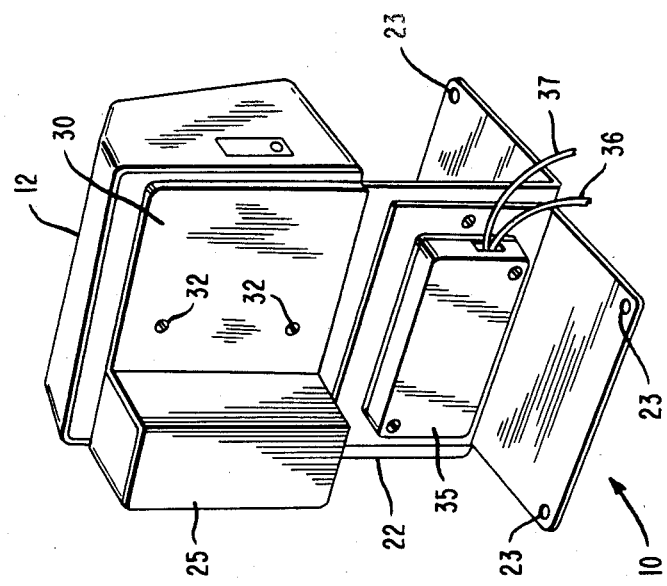
FIG. 2 is a back and left side perspective view of the terminal device of FIG. 1.
Figure 1:
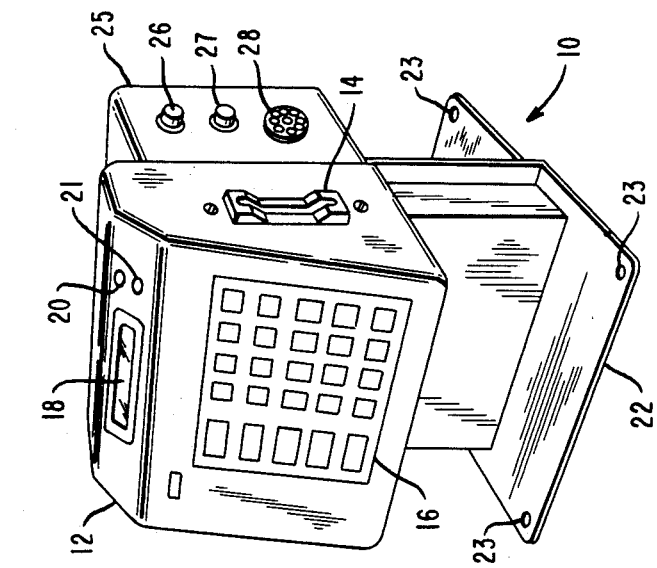
FIG. 1 is a front and right side perspective view of a terminal device having an input/output device and an audio visual status alarm unit.

FIG. 1 is a front and right side perspective view of a terminal device 10 of the present invention, and FIG. 2 is a left side and back perspective view. The terminal device 10 includes an input/output device 12 which can collect data from a badge reader 14, and a twenty element keyboard 16. The input/output device 12 also includes a thirty-two character alphanumeric liquid crystal display (LCD) 18, and two descriptor lights, one red 20 and one green 21. The input/output device 12 is mounted on a bracket 22 which in turn may be mounted on an appropriate stand or table, as desired, such as by screws through mounting holes 23.

Mounted on the back of the input/output device 12 is an audio-visual status alarm unit 25 having a pair of incandescent lamps, one green 26 and one red 27, and an audible alarm device 28. The audio-visual alarm unit 25 has its own mounting plate 30 which may be mounted to the bracket 22 by appropriate fastening devices such as screws 32, or may be mounted at a location removed from the terminal unit 10, as desired. Also located at the back of the terminal device 10 is a distribution module 35 to which is connected a power cable 36 for supplying electrical power to the terminal 10, and a communications cable 37 for providing communications between the terminal unit 10 and a computer network (not shown).

The terminal unit 10 may be configured as a point-of-exception terminal for collecting data from either the badge reader 14 or the alphanumeric keyboard 16, or both. If the audio-visual status alarm unit 25 is added to the input/output device 12, the terminal is a point-of-entry terminal which may be used to authorize entry to a restricted area. The point-of-entry terminal may also be used for making inquiries, if desired.

Figure 3:
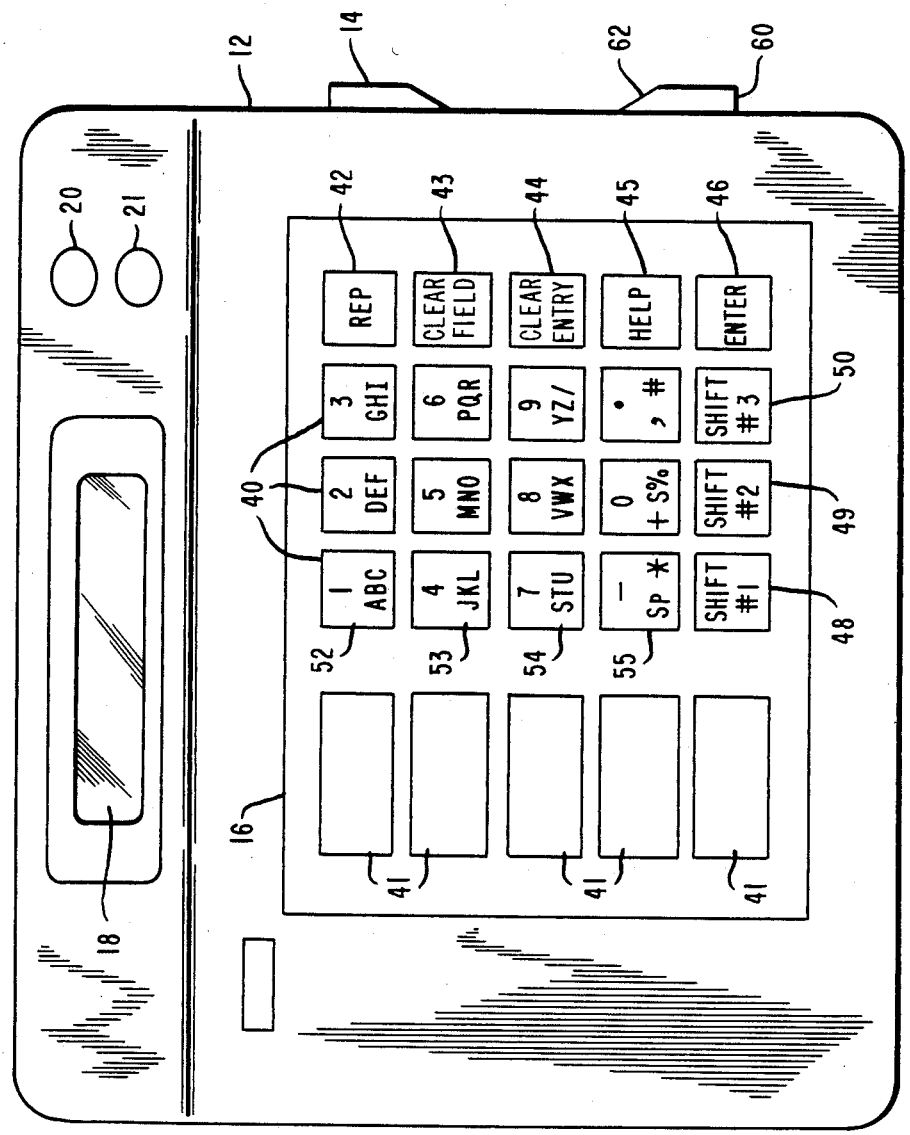
FIG. 3 is a front elevational view of the input/output device of FIG. 1.

FIG. 3 is a front elevational view of the input/output device 12 of the data terminal unit 10 of FIGS. 1 and 2. The keyboard 16 of the input/output device 12 includes a plurality of data entry keys 40 arranged in a four-by-five matrix, and a plurality of descriptor labels 41. The matrix of the data entry keys 40 includes a column of program controlled function keys 42-46. The REP key 42 is a repeat key which aborts the current transaction and resets the terminal. The CLEAR FIELD key 43 clears all characters entered in the current field from both the display 18 and an internal buffer to be discussed in connection with FIG. 11. The CLEAR ENTRY key 44 clears the last character entered. The HELP key 45 displays the field attributes and prompt messages associated with the current transaction and returns to the data entry mode. The ENTER key 46 enters the data in the terminal to be sent, when directed, from the terminal 10 to the computer network. SHIFT keys 48, 49 and 50 are provided so that more than one data character may be entered by each of the data entry keys 40. For instance, if key 52 is pressed by itself, the numeral 1 is entered. If key 52 and SHIFT key 48 are pressed together, the character A is entered. If the key 52 and the SHIFT key 49 are pressed together, the character B is entered. In this way, the numerals 0-9, the letters A-Z, and ten special characters may be entered by using a three by four matrix of data entry keys 40, as shown. The descriptor labels 41 may contain special information which may be illuminated under program control to give special functions to the first column of data entry keys 52, 53, 54, 55, and 48. The actual sequence of the data to be entered from keyboard 16 and the data to be displayed on display 18 are controlled by an application program resident in a microcomputer (166 of FIG. 11) which operates the terminal 10, as will be explained.

FIG. 4 is a right side elevational view of the input/output device 12 of terminal 10. The card reader 14 includes an external faceplate 60 which has a cutout portion 62 leading to a vertical slot or throat 64 into which a badge or card may be placed.

When a card is to be used with the terminal 10 is inserted into the throat 64, a grabber mechanism inside the input/output unit grabs the card in the proper reading location in the card reader 14, a code encoded on the card is read by a sensor device (to be explained), and the encoded data from the card is transmitted over communications cable 37 to the computer network to determine if the card transaction is valid. Additional transactions may be completed by entering requested data into the keyboard 16. If the transaction is valid, the green light 21 is energized, and the grabber mechanism in the input/output unit 12 releases the card such that it may be withdrawn by a user. If the transaction is not valid, the red light 20 is illuminated and a buzzer (185 of FIG. 11) internal to the input/output device 12 is sounded. The user may then press the repeat key 42 to terminate the transaction and release the card such that the transaction may be retried or help sought.

If the audio-visual status alarm unit 25 is attached to the terminal 10, valid transactions also illuminate the green lamp 27, in addition to the green light 21 as previously explained. If the transaction is not valid, the red lamp 26 is additionally illuminated and the alarm 28 is sounded to indicate that the attempted transaction is not valid. If the transaction is not valid, an attendant may take the user to a designated point having a point-of-exception terminal for inquiry as to why the badge transaction is not valid, or for assistance, or to be detained, as desired.

The input/output device 12 includes a bracket 65 for mounting the input/output device 12 to the bracket 22 of the terminal 10. The audio-visual status device 25 may be mounted either on the bracket 22 of the terminal 10, or may be placed at a convenient location to be monitored by an attendant, as desired. Thus, several point-of-entry terminals may be placed at separate locations with their audiovisual status devices 25 grouped together at a central location to be monitored by a single attendant.

Figure 6:
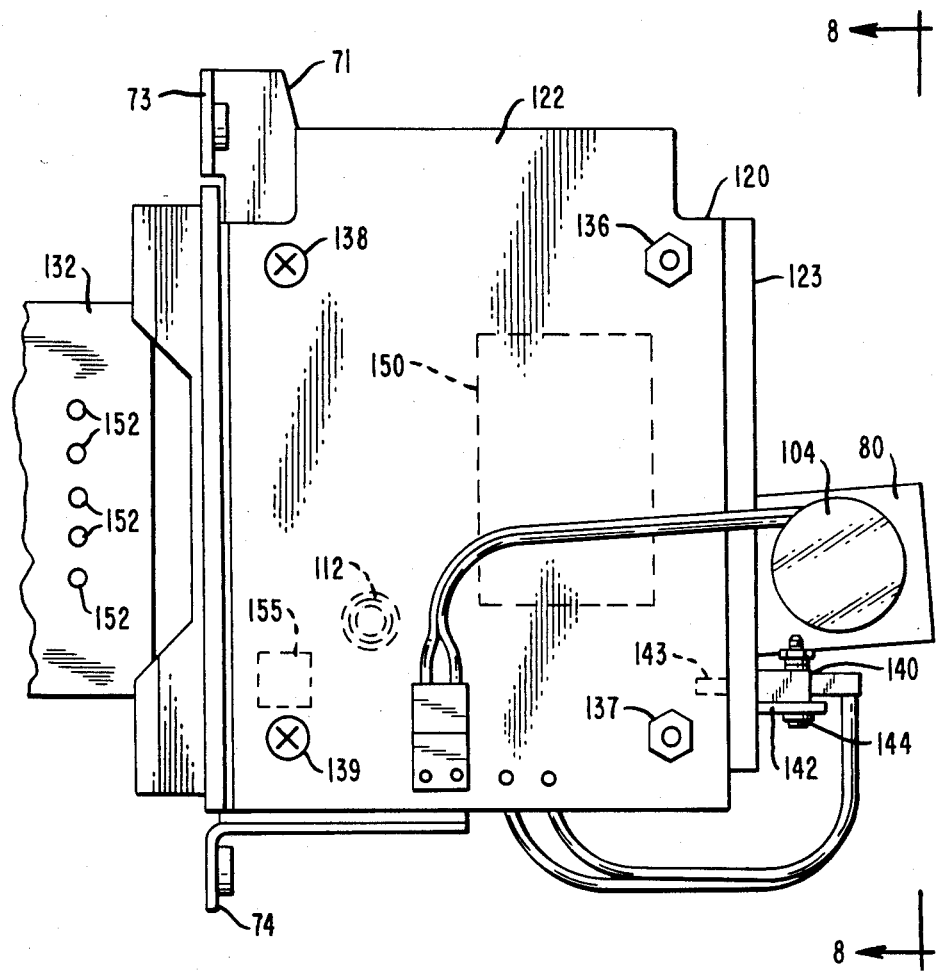
FIG. 6 is a left side elevational view of the badge reader module of FIG. 5.
Figure 8:
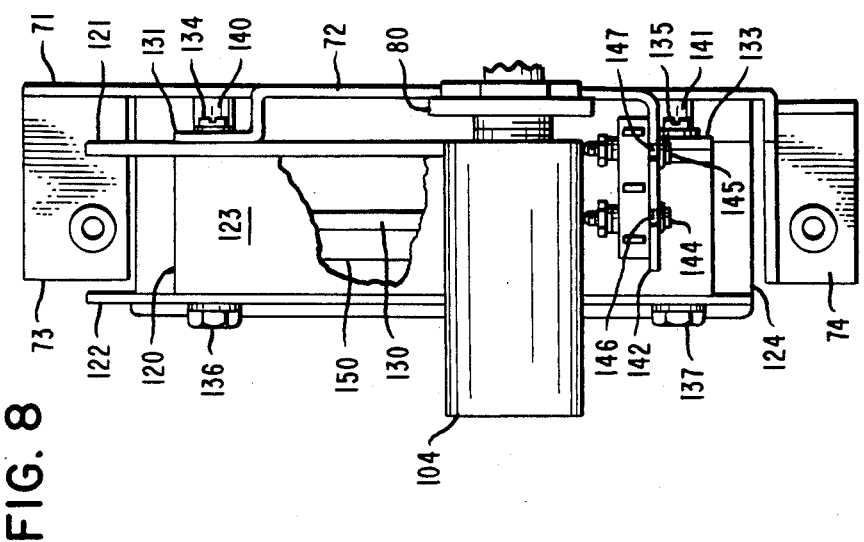
FIG. 8 is a back elevational view of the badge reader module taken along line 8—8 of FIG. 6.
Figure 7:
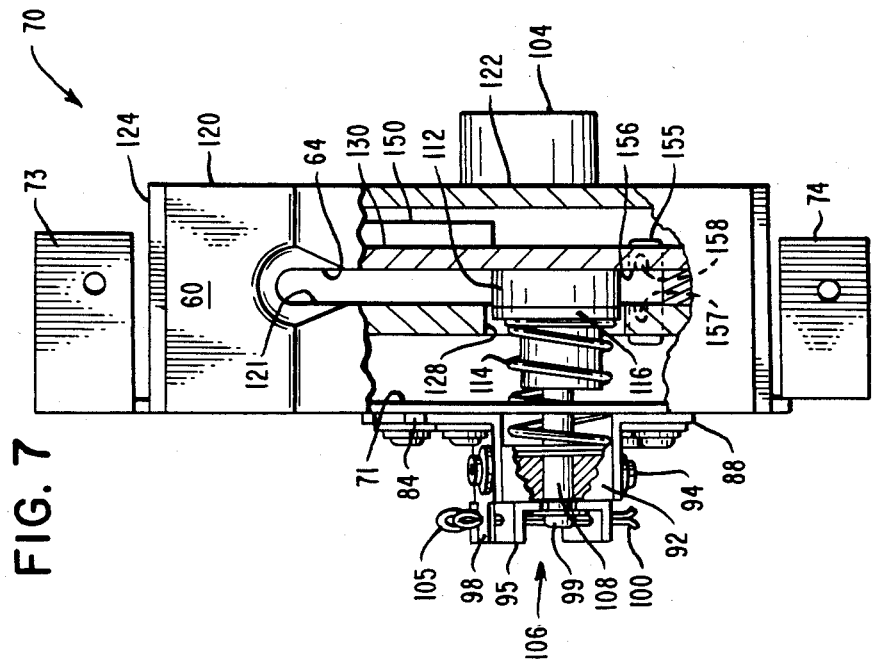
FIG. 7 is a front elevational view of the badge reader module taken along line 7—7 of FIG. 5.

FIG. 5 is a left side elevational view of a card reader module 70 located inside the input/output device 12 of FIGS. 1 and 2, FIG. 6 is a right side elevational view, FIG. 7 is a front elevational view taken along line 7—7 of FIG. 5, FIG. 8 is a back elevational view taken along line 8—8 of FIG. 6, and FIG. 9 is a bottom elevational view taken along line 9—9 of FIG. 5. The card reader module 70 includes a badge reader bracket 71 and a switch bracket 72. The badge reader bracket 71 includes an upper flange 73 and a lower flange 74 for securing the badge reader module 70 to the sidewall of the input/output device 12 by screws 75 and 76 (see FIG. 4). A solenoid mounting plate 80 is attached to the switch bracket 72 by screws 81 and 82 (see FIG. 5). An upper base bracket 84 is attached at its front to the badge reader bracket 71 by a screw 85, and at its back to the switch bracket 72 by a screw 86. A lower base bracket 88 is attached at its front to the badge reader bracket 72 by a screw 89 and at its back portion to the switch bracket 72 by a screw 90. The holes in the upper base bracket 84 through which the screws 85 and 86 pass and the holes in the lower base bracket 88 through which screws 89 and 90 pass are elongated, as shown in phantom in FIG. 5, such that the exact spacing between the brackets 71 and 72 may be adjusted as desired. Thus, the bracket assembly may be accurately located by the use of an appropriate mounting jig, even though the brackets 71, 72, 84 and 88 may vary because of machine tolerances.

A foot guide plate 92 is located between the base brackets 84 and 88 and secured by bolts 93 and 94 passing through holes through the base brackets 84 and 88 and the foot guide plate 92. The holes in the base brackets 84 and 88 (a portion of one shown at 91 in FIG. 9) are elongated such that the exact location of the foot guide plate 92 may be adjusted, as desired. A solenoid lever bar 95 is located between the base brackets 84 and 88. The solenoid lever bar 95 is aligned to be substantially parallel to and positioned between the base brackets 84 and 88. However, as shown in FIG. 5, the solenoid lever bar 95 may be at a slight angle with respect to the base brackets 84 and 88 without affecting its operation. Upper base bracket 84 has a tab 98 and lower base bracket 88 has a tab 99 (see FIGS. 5, 7 and 9). The solenoid lever bar 95 is a channel having raised sides (see FIGS. 7 and 9). A cotter pin 100 passes through holes in the tabs 98 and 99 and corresponding holes in the raised sides of the solenoid lever bar 95, thereby forming a pivot around which the solenoid lever bar 95 may rotate, as shown by arrows 96 and 97 of FIG. 9. The plunger 102 of a solenoid 104 is attached at one end of the solenoid lever bar 95 by a cotter pin 105 (see FIG. 10), and a grabber assembly 106 (see FIG. 7) to the other end.

Referring to FIGS. 7 and 9, the grabber assembly 106 includes a threaded extension member 108, extending for slidable movement through a central bore 107 in the foot guide plate 92. One end of the threaded extension member 108 is fastened by a screw 109 through a washer 110 and a slot 111 in the end of the solenoid lever bar 95 (see FIG. 5). The free end of the threaded extension 108 extends through the central bore 107 through the foot guide plate 92, and continues through a hole 113 in the badge reader bracket 71, terminating in a rubber foot member 112 screwed onto the threaded extension member 108 by a screw 115. A spring 114 is trapped between the rubber foot member 112 and plate 92 has a slightly recessed counter bore 117 in the inwardly directed face of the foot guide plate 92. The rubber foot 112 is backed up by a spring retaining member 116 for holding the spring 114 in alignment.

It will thus be seen that when the solenoid 104 is energized, its plunger 102 will be moved inwardly or to the right in FIGS. 7 and 9, causing the solenoid lever bar 95 to rotate around the cotter pin 100. This action will move the slotted end of the solenoid lever bar to the left in FIG. 9, pulling the grabber assembly 106 to the left and compressing spring 114.

Referring to FIG. 10, a portion 118 of the solenoid 104 is threaded such that it may be screwed into a threaded opening in the solenoid mounting plate 80. The solenoid 104 is then locked into place by a lock nut 119 which is tightened against the solenoid mounting plate 80. In this way, the stroke of the plunger 102 of the solenoid 104 may be adjusted such that when the plunger 102 is fully retracted within the solenoid 104, the grabber assembly 106 is moved sufficiently to allow a card to be freely inserted into the badge reader module 70, as will be discussed. When the solenoid 104 is de-energized, the spring 114 (see FIGS. 7 and 9) returns the grabber foot 112 to its initial position, grabbing a card which has been inserted into the badge reader module 70.

The badge reader module 70 includes a sensor enclosure 120 which has a left wall 121 (see FIG. 5), a right wall 122 (see FIG. 6), a back member 123 (see FIG. 8), and a front member 124 (see FIG. 5). The front member 124 includes the face plate 60 external to the input/output device 12 (see FIG. 4). Referring to FIG. 7, the left wall 121 has a hole 128 through which the rubber foot 112 of the grabber assembly 106 passes. Also shown in FIG. 7, the sensor enclosure 120 has an internal partition 130 which is spaced from left wall 121 to define the throat 64 for receiving a badge or card 132 from a user (see FIG. 6). The distance between the left wall 121 and the partition 130 is typically about 0.050 inches to accommodate the thickness of the badge or card 132 to be used with the badge reader module 70.

Referring to FIGS. 5 and 8, the switch bracket has a pair of bent tabs 131 and 133. A pair of bolts 134 and 135 pass through the tabs 131 and 133, respectively, and through the sensor enclosure 120 to be secured on their ends by nuts 136 and 137, respectively. Screws 138 and 139 (see FIGS. 6 and 9) pass through the sensor enclosure 120 and are screwed into threaded posts 140 and 141 on the badge reader bracket 71 (see FIGS. 5 and 8).

Referring to FIG. 6, a microswitch 140 is located at the back of the sensor enclosure 120 and is secured to an extension 142 of the switch bracket 72 (see FIGS. 6 and 8). The microswitch 140 includes a spring loaded switch lever 143 extending into the sensor enclosure 120 which acts as a stop for the card 132 being inserted into the sensor enclosure 120. The fully closed position of the switch lever 143 positions the card 132 in a proper position to be sensed by a badge sensor mechanism 150. The microswitch 140 is secured to the bracket extension 142 by screws 144 and 145 which pass through slots 146 and 147 (see FIG. 8). The badge sensor mechanism 150 is located in the sensor enclosure 120 between the right wall 122 and the partition 130 (see FIG. 7). In the particular embodiment disclosed herein, data is recorded on the card 132 by a plurality of holes 152 using a two-of-five coding scheme. The sensor mechanism 150 includes an array of LED sensors (not shown) for sensing the holes 152. However, any recording and encoding scheme and appropriate sensor may be used, as desired. Since the encoding technique does not form a part of the present invention, it will not be discussed further.

Referring to FIGS. 6 and 7, an LED sensor 155 has an open channel 156, an LED 157 on one side of the channel 156, and a photo transistor 158 on the other. The LED sensor 155 senses the edge of a card 132 entering the channel 156 as the card 132 is being inserted into the throat 64 of the badge reader assembly 70. The final position of the card 132 under the sensing mechanism 150 may be adjusted by adjusting the location of the microswitch 140 in the slots 146 and 147, such that the card 132 is accurately positioned for proper reading by the sensor mechanism 150 when the rubber foot 112 grabs the card 132.

In operation, a card 132 is inserted into the throat 64 by a user. When the LED sensor 155 detects the edge of the card 132, the solenoid 104 is activated, moving the grabber assembly 106 such that the rubber foot 112 moves away from the partition 130. The position of the solenoid 104 is adjusted such that the rubber foot 112, when retracted, moves flush to, or slightly recessed into, the wall 121 such that the card 132 will not drag against the rubber foot 112 as it is inserted into the throat 64. When the card 132 is properly positioned in the sensor enclosure 120, as determined by the spring loaded lever 143 of the microswitch 140, the solenoid 104 is de-energized. The spring 114 then urges the rubber foot 112 into contact with the card 132 which is now located between the left wall 121 and the partition 130 of the sensor enclosure. The sensing mechanism 150 then senses the data recorded by the holes 152. The data is then processed to determine if the transaction is valid. If valid, the solenoid 104 is energized to move the rubber foot 112 away from the card 132, such that it may be withdrawn. If the card 132 is not valid, the solenoid 104 is not activated, the red lights 21 and 26 are illuminated, and the alarms 185 and 28 are sounded, as will be explained.

Referring to FIG. 9, it will be seen that the ends of the solenoid lever bar 95 move in arcs 96 and 97 as the solenoid lever bar 95 rotates about the pivot point formed by the cotter pin 100. The slight arc 96 is sufficient to cause the leading edge of the rubber foot 112 to lift slightly before its trailing edge. This action, coupled with the acceleration action of the solenoid 104, is sufficient to give a slight kick to the card 132. This slight kick is assisted by the spring action of the lever 143 of the microswitch 140 to slightly kick the card 132 out of its fully inserted position so that it may be retrieved by a user.

As also seen in FIG. 9, the position of foot guide plate 92 in the elongated holes in base brackets 84 and 88 are adjusted such that the solenoid lever bar 95 is level. This allows for the grabber assembly 106 to be adjusted so that the rubber foot 112 grabs the card 132 squarely, and so that the kicking action described in connection with rubber foot 112 is directed outwardly when the solenoid 104 is energized, as desired. It will also be seen in FIG. 5 that the brackets 84 and 88 are canted with respect to brackets 71 and 72 such that the microswitch 140 may be placed directly behind the sensor 155 (see FIG. 9), and that the rubber foot 112 will grab the card 132 near the downwardly directed edge of the card 132.

Figure 11:
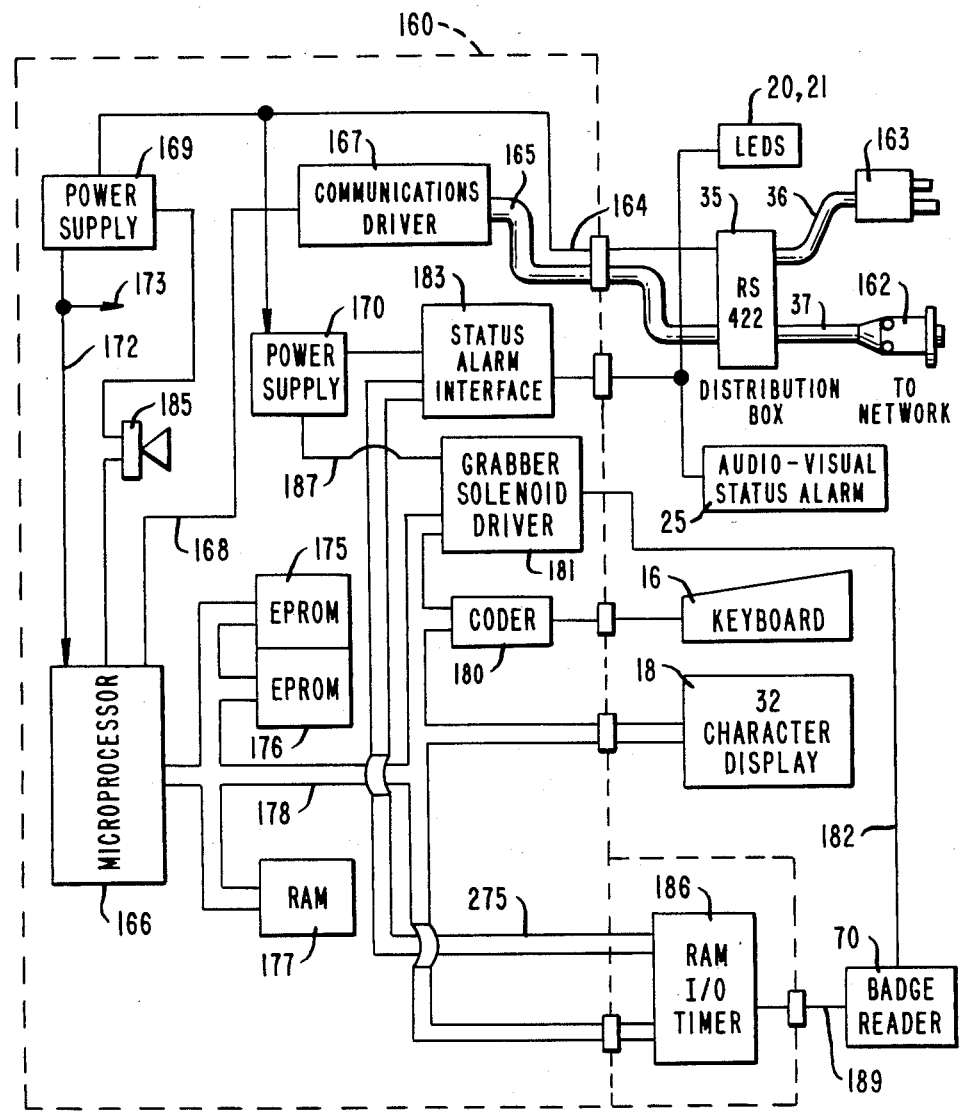
FIG. 11 is a block diagram of the electrical components of the terminal of FIGS. 1 and 2.

FIG. 11 is a block diagram showing the interconnection of the components of the terminal 10 of FIGS. 1 and 2. A processor module 160 located within the input-/output unit 12 of FIG. 1 exchanges data between a computer network and the keyboard 16, the character display 18 and the badge reader 70, as previously described. A connector 162 terminates the communications cable 37 which is connected to the distribution box 35. A plug-in transformer 163 is plugged into a power supply for providing DC power over cable 36 to the distribution box 35. The DC power is then supplied to the terminal 10 over conductor 164, and data is exchanged between the terminal 10 and the computer network, via distribution box 35, cable 37 and connector 162, over a communications cable 165. A microprocessor 166 exchanges data with the communications cable 165 via a communications driver 167 and an input/output bus 168. DC power is provided to a pair of power supplies 169 and 170 via power cable 164. The power supply 169 converts and conditions the DC power on conductor 164 for use by the microprocessor 166 and other electrical components of the terminal 10, via conductors 172 and 173. Application firmware for the control of microprocessor 166 is contained in one or more read only memories which may be electrically programmable read only memories (EPROMs) 175 and 176. A random access memory (RAM) 177 provides input/output buffers for the transmission of data between the computer network and the terminal 10. A data bus 178 is connected to the microprocessor 166 and other elements in the terminal 10 which either input data to the microprocessor 166 or receive data from the microprocessor 166, as will be explained.

Data from the keyboard 16 is transmitted to the microprocessor 166 via a coder 180 and the input/output bus 168. Command signals are sent from the microprocessor 166 under firmware control to a grabber solenoid driver circuit 181 via data bus 178. Electrical command signals over conductor 182 to the badge reader 70 operates the solenoid 104 previously described in connection with FIGS. 5-9.

An input/output (I/0) timer module 186 is connected to the input/output bus 178. The I/0 timer module 186 includes a RAM (not shown) which may be loaded with time of day information from the microprocessor 166. A timer (not shown) in the module 186 then keeps its own time of day which is transmitted to the microprocessor 166 with identifying information from the badge reader 70 to be transmitted to the computer network when the terminal 10 is used in an application which includes time clock capabilities. In this instance, a user would insert his badge or card into the badge reader 70, and his identification along with the current time of day will be sent to the computer network to maintain timekeeping records. The I/0 timer module 186 provides timed, alternately energized signals over a bus 275 to a status alarm interface 183 such that the red lights 20 and 26 flash and a warbling tone is emitted by alarm 28 when a transaction is not valid, as explained in connection with FIGS. 1 and 2. The status alarm interface 183 alternately illuminates green lights 21 and 27 when the transaction is valid. Information from the badge reader 70 and the condition of the sensor 155 and the switch 140 are transmitted over a bus 189 to the microprocessor 166 via the input/output bus 178 and the I/0 timer module 186.

Power requirements for the grabber solenoid driver 181 and the status alarm interface 183 are satisfied by the separate power supply 170 such that the power supply requirements for the operation of the grabber solenoid driver 181 and status alarm interface 183 are isolated from the power supply 169 and the electronic components powered thereby. In addition to the audible alarm 28 in the audio-visual status alarm module 25, a separate audible alarm 185 is driven by the microprocessor 166. The audible alarm 185 operates similarly to the audible alarm 28 in the audio-visual alarm unit 25, as previously described in connection with FIGS. 1 and 2.

Figure 12A:
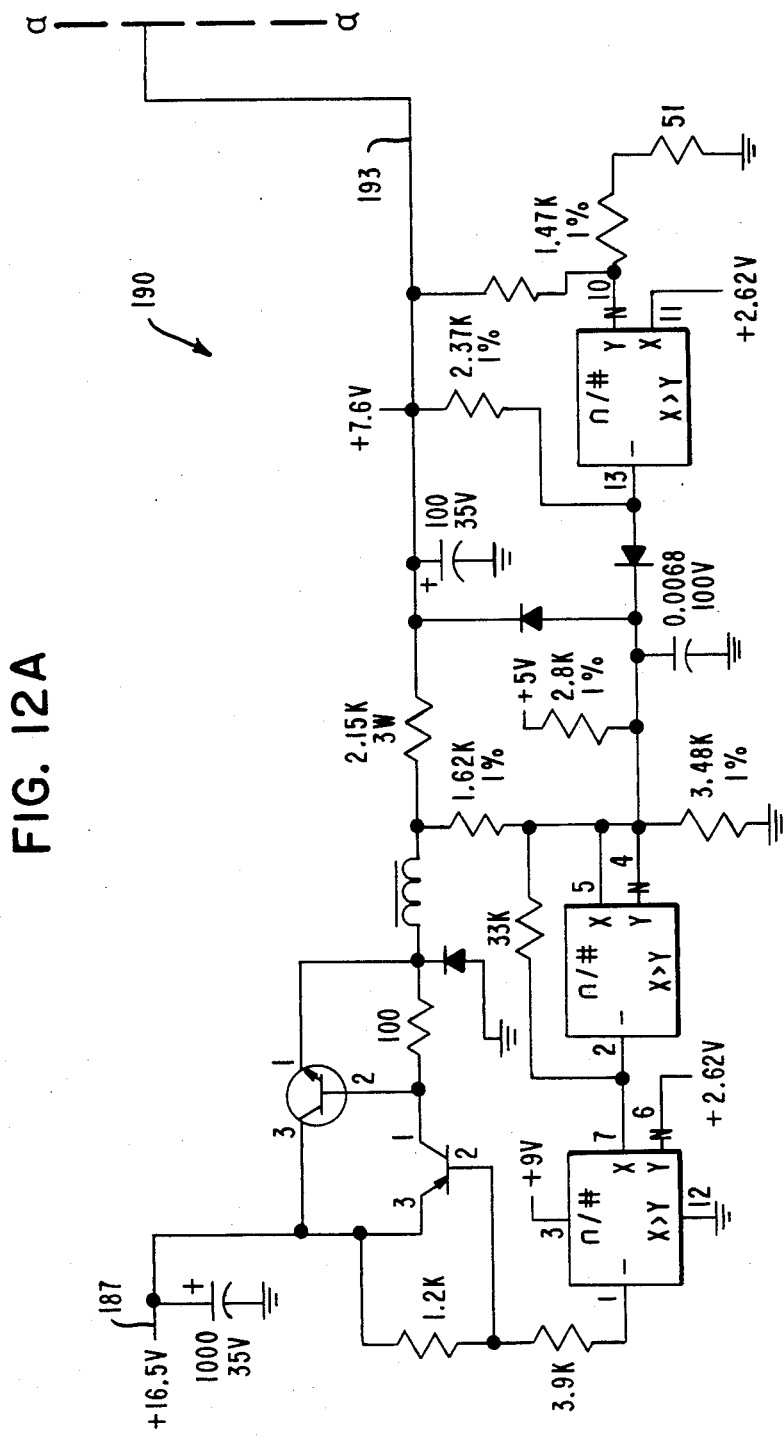
FIGS. 12A and 12B, joined along line a—a, form a schematic diagram of a grabber solenoid driver circuit of FIG. 11.
Figure 12B:
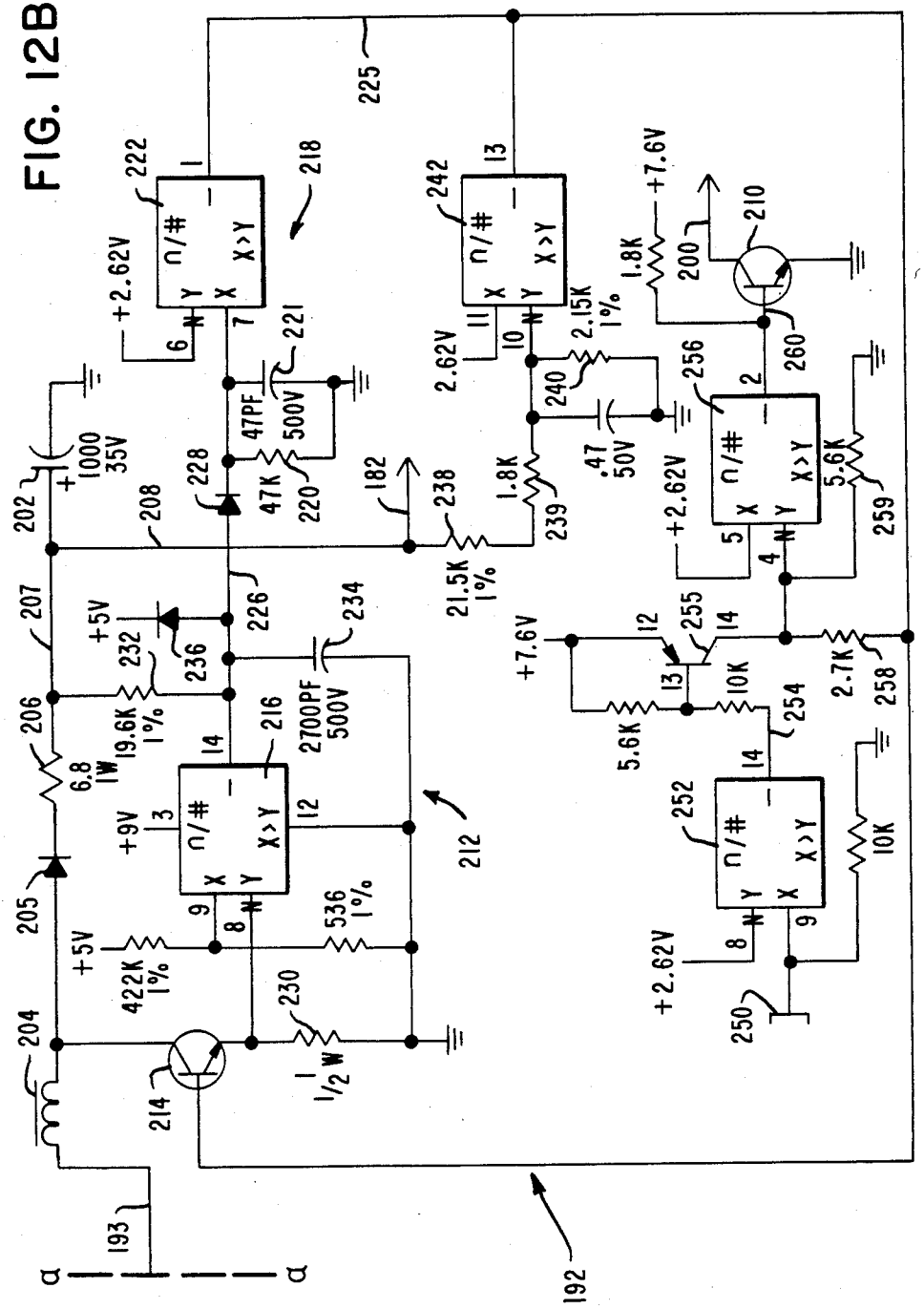

FIGS. 12A and 12B, joined along line a—a, form a schematic diagram of the grabber solenoid driver 181 of FIG. 11. FIG. 12A shows a power supply 190 for supplying power to a solenoid driver circuit 192 to be described in connection with FIG. 12B. The power supply 190 of FIG. 12A has its power requirements satisfied via a conductor 187 from the power supply 170 of FIG. 11.

The output of the power supply of 190 of FIG. 12A is inputted into the driver circuit 192 of FIG. 12B via conductor 193. The driver circuit 192 supplies electrical current to energize the solenoid 104 of FIGS. 5-10 via an output conductor 182, as shown in FIGS. 11 and 12B. There are two current requirements for a solenoid. When a solenoid having an initial position with its plunger extended is first energized, a first higher current is needed to position to the plunger of the solenoid from its initial extended to its retracted or seated position. Once the plunger of the solenoid is retracted, its current requirements are much less to merely hold the plunger in its seated position. This second requirement is referred to herein as holding current.

It will be understood that the solenoid 104 described in connection with FIGS. 5-10 is connected between the conductor 182 and conductor 200 of FIG. 12B. The initial energizing current for energizing the solenoid 104 is provided by a capacitor 202. The electrical path for the holding current of the solenoid 104 is conductor 193, an inductor 204, a diode 205, a resistor 206, conductors 207 and 208, conductor 182, conductor 200, and a transistor switch 210 to ground. A current pump 212 is provided to pump a charge into capacitor 202 to a voltage level of approximately 30 volts. The current pump 212 includes the inductor 204, an NPN transistor switch 214, a comparator 216 which acts basically as an inverter, as will be explained, and a pump timer 218. The pump timer 218 includes resistors 220 and 232, capacitors 221 and 234, a diode 228, and a comparator 222 whose output is connected to the base of the transistor switch 214 via a conductor 225.

When the transistor switch 214 is off, the voltage on the Y input of the comparator 216 will be below the voltage on its X input, and its output, connected to node 226, will be high. With the voltage on node 226 high, the diode 228 will be forward biased, causing the voltage on the X input of the comparator 222 to rise as controlled by the timer circuit 218. When the voltage on the X input of the comparator 222 exceeds the voltage on its Y input, its output will go high, thus turning on the transistor switch 214 via conductor 225. With the transistor switch 214 turned on, the voltage across resistor 230 will increase, placing an increasing voltage on the Y input of the comparator 216. When this voltage increases above the X input of the comparator 216, its output and the node 226 will go negative. The diode 228 will then be reversed biased, which allows the voltage on the X input of the comparator 222 to begin to fall, as controlled by the timer circuit 218. When the voltage on the X input of comparator 222 falls below the voltage on its Y input, its output will go negative, turning off transistor switch 214. With the voltage on the node 226 at a negative value as explained, current may flow through the resistor 232 from the conductor 207 and into the capacitor 234. As the capacitor 234 is thus charged, the voltage on node 226 rises until the diode 228 is again forward biased. As described before, this causes the voltage on the X input of the comparator 222 to rise until the transistor switch 214 is again turned on via conductor 225. A diode 236 has its anode connected to node 226 and its cathode connected to a 5 volt power supply to clamp the voltage on node 226 such that it does not exceed 5 volts.

It will thus be understood that the current pump 212 oscillates such that the transistor switch 214 is repeatedly turned on and off. Each time the transistor switch 214 turns on, energy is stored in the inductor 204. When the transistor switch 214 is turned off, the energy stored in the inductor 204 is dumped through the diode 205, resistor 206 and conductor 207 into the capacitor 202. As the capacitor 202 is thus charged up, its voltage is applied to a voltage divider made up of resistors 238, 239 and 240. When the voltage on the Y input of a comparator 242 exceeds the voltage on its X input, its output goes negative. This negative voltage turns off transistors 214 via conductor 225 and holds it off until the voltage on the capacitor 202 leaks below a set level, or the solenoid 104 is energized. The resistors 238, 239 and 240 are sized such that the voltage applied to the X input of comparator 242 is equivalent to a voltage on the capacitor 202 of about 30 volts. It would be understood that while the capacitor 202 is being charged from about 4 volts to about 30 volts, the voltage on the X input of the comparator 242 will exceed the voltage on its Y input, such that the voltage on its output will be high.

Connector 250 is connected to a conductor in the data bus 178 from microprocessor 166 (see FIG. 11). When the microprocessor 166 commands the solenoid driver circuit 181 to energize the solenoid 104, a high voltage is placed on connector 250. With a high on the connector 250, the voltage on the X input of a comparator 252 exceeds the voltage on its Y input, causing its output and a connected conductor 254 to go high. A high voltage on conductor 254 turns off a PNP transistor switch 255. With the transistor switch 255 turned off, the voltage on the Y input of a comparator 256 drops to ground. Conductor 225 will also be grounded through resistors 258 and 259, causing the voltage on the conductor 225 to turn off the transistor switch 214. With the Y input of the comparator 256 grounded, its output at 260 will go high turning on and NPN transistor switch 210, thereby energizing the solenoid 104, as previously explained.

When the signal on connector 250 goes to a low, the transistor switch 255 is turned on, and the transistor switch 20 is turned off. It will be understood that the outputs of the comparator 222, 242 and the collector of the transistor switch 255 are wired together such that if the voltage of any one of them goes low, the transistor switch 214 will be held off.

Figure 13:
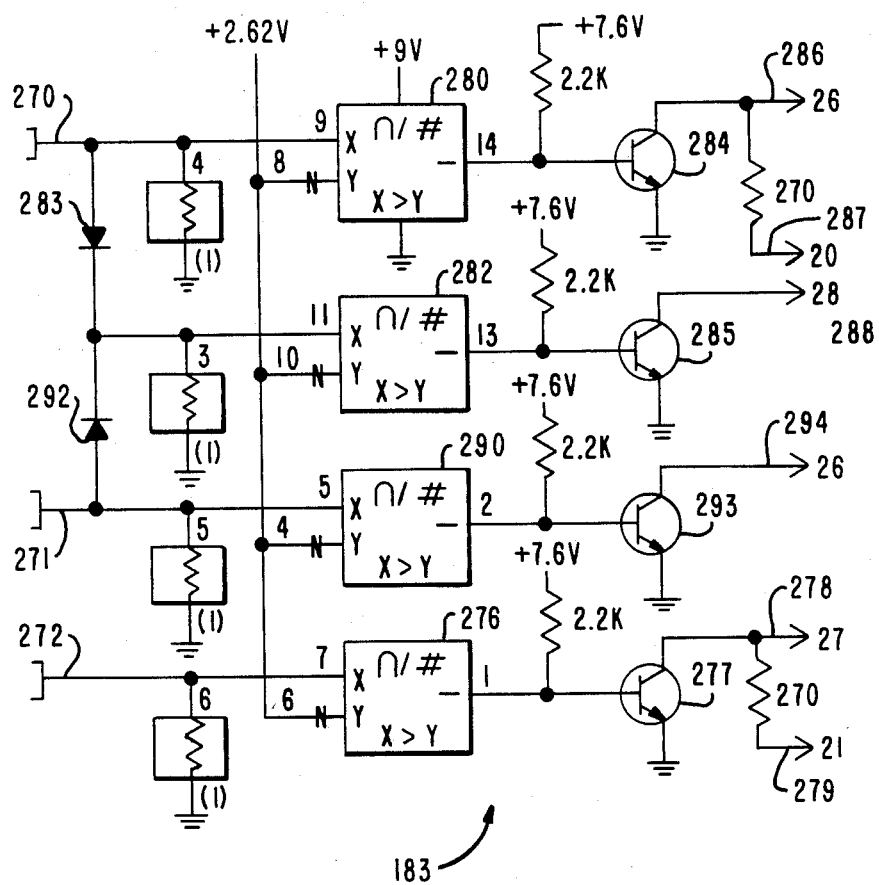
FIG. 13 is a schematic diagram of a status alarm interface circuit of FIG. 11.

FIG. 13 is a schematic diagram of the status alarm interface 183 of FIG. 11. Conductors 270, 271 and 272 are connected to the timer bus 275 from the I/0 timer module 186 of FIG. 11. When a transaction has been completed, the microprocessor 166 sends signals over I/0 bus 178 to the I/0 timer module 186 to indicate if the transaction was valid or invalid. The I/0 timer module 186 then commands the alarm status interface 183 to either illuminate the green lights 21 and 27, as described in connection with FIG. 1, or to illuminate the red lights 20 and 26 and sound the audible alarm 28 of the audio-visual status alarm unit 25, also discussed in connection with FIG. 1. If the badge transaction is valid, a high voltage is placed on conductor 272, which is inputted to the X terminal of a comparator 276. The output of the comparator 276 is connected to the base of a transistor switch 277 which, when turned on, illuminates the green light 27 via conductor 278 and the green LED 21 via a conductor 279.

When the badge transaction is not valid, a pair of timed alternating signals are placed on the conductors 270 and 271 via the bus 275 from the I/0 timer circuit 186 to the status alarm interface 183. When the signal on conductor 270 is high, it is placed on the X input of a comparator 280, and the X input of a comparator 282 via a diode 283. This turns on transistor switches 284 and 285. Transistor switch 284, when turned on, illuminates the red light 26 and the red LED 21 via conductors 286 and 287, respectively. When transistor switch 285 is turned on, the audible alarm 28 of the audio-visual status alarm unit 25 is energized via conductor 288. The I/0 timer unit 186 then turns off the voltage on conductor 270 and turns on the voltage on conductor 271. Conductor 271 is connected to the X input of an comparator 290, and the X input of the comparator 282 via a diode 292. The output of the comparator 290 turns on a transistor switch 293, which illuminates the red light 26 via a conductor 294. Thus a high on conductor 271 illuminates the red light 26 and also energizes the audible alarm 28. The signals on conductors 270 and 271 are timed by the I/0 timer 186 such that the red light 26 flickers and the audible alarm 28 has a warbling sound. Since the LED 20 is connected to only one of the transistor switches, it blinks on an off as the voltage on conductor 270 is alternately turned on and off.

The values of the various electrical components of FIGS. 12A and 12B and FIG. 13 are as shown. The various comparators of these figures may be LM 339 devices available from National Semiconductor Company. The application program in EPROMs 175 and 176 are programmed to energize the solenoid 104 when the LED sensor 155 senses a card 132 in the throat 64. When the microswitch 142 senses that the card 132 is at the proper sensing location, the signal on connector 250 goes low so that the solenoid 104 is de-energized and the card 132 is grabbed by the rubber foot 112. If the card transaction is valid, the signal on connector 250 again goes high such that the card 132 is partially kicked out of the throat 64 to be retrieved by a user.

To reduce the number of operating cycles of the solenoid 104 and the mechanism of FIGS. 5-9, a timing sequence is included in the firmware for the microcomputer 166 to keep the solenoid 104 energized for a set length of time after a card 132 has been removed from the badge reader 70. Thus, if several card transactions for different users are to be performed in a row, the solenoid 104 remains energized after each transaction to allow a new card to be inserted without having to de-energize and then energize the solenoid 104 between each transaction. After a set length of time after the last transaction, typically 30 seconds, the solenoid 104 is de-energized, and the terminal 10 is reset to wait for a new badge transaction.

Thus, a badge validation terminal system has been described which meets the aforementioned objects. It will be understood by those skilled in the art that the disclosed embodiment is exemplary only, and that various components disclosed herein may be replaced by equivalents without departing from the invention hereof, which equivalents are covered by the appended claims.

What is claimed is:

1. A grabber mechanism in a badge reader for grabbing a card to be read thereby, said grabber mechanism comprising:
    a lever bar having a first end and a second end;
    pivot means intermediate said first and second ends of said lever bar about which said lever bar may rotate from a first position to a second position;
    a solenoid connected to said first end of said lever bar, said solenoid for moving said first end when energized such that said lever bar is moved from its first position to its second position;
    grabber means having a proximate end attached to said second end of said lever bar, and a distal end;
    spring means which normal urgency is overcome when said lever bar is rotated from its first position to its second position by said solenoid, and which urges said grabber means and moves said attached second end of said lever bar from its second position toward its first position when said solenoid is not energized; and
    a fixed partition having a plane generally normal to said distal end of said grabber means and positioned at a location proximate to the location of said distal end when said lever bar is in its second position such that when said lever bar moves to its second position, said distal end moves away from said fixed partition allowing a card to be read to be slidably moved between said distal end and said fixed partition, and when said lever bar moves toward its first position from its second position the card to be read is grabbed and held between said distal end and said fixed partition responsive to the urging of said spring means.

2. The grabber mechanism of claim 1 further comprising:
    foot means on said distal end of said grabber means for grabbing and holding a card to be read positioned between said distal end and said fixed partition.

3. The grabber mechanism of claim 2 further comprising:
    foot guide plate means fixed between the first position of said second end of said lever bar and said fixed partition and having an aperture for slidable movement therethrough of said proximate end of said grabber means as said lever bar rotates between its first position and its second position;
    said spring means being trapped between said foot guide plate means and said foot means.

4. The grabber mechanism of claim 3 further comprising:
    fixed wall means spaced between said fixed partition means and said foot guide plate means, and having an aperture through which said distal end and said attached foot means pass when said lever bar is in its first position;
    said fixed wall means and said fixed partition defining a throat for receiving a card to be read.

5. The grabber mechanism of claim 4 further comprising:
    first sensor means in said throat for sensing the entry of a card therein;
    solenoid driver means connected to said first sensor means and said solenoid for energizing said solenoid when said first sensor means senses the entry of a card into said throat.

6. The grabber mechanism of claim 5 further comprising:
    second sensing means in said throat for sensing when a card in said throat is positioned in a specified reading location; and
    connecting means connecting said solenoid driver means to said second sensor means such that said solenoid is de-energized responsive to said second sensor means thereby allowing said spring means to urge said lever bar toward its first position.

7. The grabber mechanism of claim 6 further comprising:
    adjustment means between said lever bar, said foot guide plate means, and said grabber means for adjusting the attitude of said rubber foot as it is moved into and out of engagement with a card in said throat;

the adjusting of said adjustment means being such that one edge of said foot is moved slightly before its other edge as said lever bar is moved from its first position toward its second position so that a card engaged by said foot is given a slight kick, partially ejecting the card from said throat.

8. A grabber mechanism in a badge reader comprising:
- a switch bracket;
- a badge reader bracket spaced from said switch bracket;
- a first base bracket having one end attached to said switch bracket and the other end attached to said badge reader bracket;
- a second base bracket parallel to and spaced from said first base bracket, said second base bracket having one end attached and said switch bracket and the other end attached to said badge reader bracket;
- a foot guide plate secured between said first and second base brackets and aligned such that an aperture through said foot guide plate registers with an aperture through the badge reader bracket;
- a lever bar located substantially parallel to and positioned between said first and second base brackets such that an aperture in said one end thereof is in register with the apertures through said foot guide plate and said badge reader bracket;
- pivot means through said first and second base brackets and said lever bar therebetween and intermediate the ends of said lever bar for allowing pivotal movement of said lever bar from a first position and a second position;
- an extension member having a proximate end and a distal end, said proximate end extending through the apertures in said badge reader bracket and said foot guide plate, and connected to said lever bar through the aperture in said one end thereof;
- a foot member on the distal end of said extension member;
- a spring member between said foot member and said foot guide plate for allowing movement of said extension member as said lever bar moves from its first position to its second position, and for urging said foot member so as to move said lever bar from its second position toward its first position;
- solenoid means connected to the other end of said lever bar for moving said lever bar from its first position to its second position when
- fixed partition means having a plane generally normal to said foot member and located proximate to the location of said foot member when said lever bar is in its first position for defining one side of a throat of the badge reader, whereby a card may be inserted into said throat between said foot member and said fixed partition means when said lever bar is in its second position and whereby said card will be trapped between said foot member and said fixed partition means when said lever bar is in its second position.

9. The grabber mechanism of claim 8 further comprising:
- a first sensor in said throat for detecting a card inserted therein; and
- a solenoid driver connected to said first sensor and said solenoid means for energizing said solenoid means when said first sensor detects a card in said throat.

10. The grabber mechanism of claim 8 whereby said foot member is made of a resilient material.

11. The grabber mechanism of claim 9 further comprising a second sensor attached to said switch bracket and said solenoid driver for detecting when a card inserted into said throat has reached a reading position, said solenoid driver de-energizing said solenoid when said second sensor senses the card in the reading position.

* * * * *